US012374260B2

(12) United States Patent
Lin et al.

(10) Patent No.: US 12,374,260 B2
(45) Date of Patent: Jul. 29, 2025

(54) DISPLAY DEVICE AND GRAYSCALE COMPENSATION METHOD THEREOF

(71) Applicant: Novatek Microelectronics Corp., Hsinchu (TW)

(72) Inventors: Chan-Yi Lin, Hsinchu (TW); Yen-Tao Liao, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 54 days.

(21) Appl. No.: 18/297,626

(22) Filed: Apr. 9, 2023

(65) Prior Publication Data

US 2024/0339067 A1 Oct. 10, 2024

(51) Int. Cl.
*G09G 3/20* (2006.01)
*G09G 3/3233* (2016.01)

(52) U.S. Cl.
CPC ......... *G09G 3/2092* (2013.01); *G09G 3/2074* (2013.01); *G09G 3/3233* (2013.01); *G09G 2310/027* (2013.01)

(58) Field of Classification Search
CPC ........... G09G 3/2092; G09G 2310/027; G09G 3/2074; G09G 3/3233; G09G 3/20; G09G 3/2003; G09G 2320/0271
See application file for complete search history.

(56) References Cited

U.S. PATENT DOCUMENTS 9,892,686 B2 2/2018 Xu et al.
2006/0077142 A1* 4/2006 Kwon .................. H03M 1/664 345/77
2015/0302817 A1 10/2015 Sun
2016/0019838 A1 1/2016 Park
2016/0189628 A1 6/2016 Choi
2017/0140705 A1* 5/2017 Xu ...................... G09G 3/3258
(Continued)

FOREIGN PATENT DOCUMENTS

CN 104867455 8/2015
CN 110364111 10/2019
(Continued)

OTHER PUBLICATIONS

Machine translation of Tiawan office action cited by Applicant in IDS dated May 23, 2024. (Year: 2024).*
(Continued)

*Primary Examiner* — Patrick N Edouard
*Assistant Examiner* — Joseph P Fox
(74) *Attorney, Agent, or Firm* — JCIPRNET

(57) ABSTRACT

A display device and a grayscale compensation method thereof. The display device includes a data conversion circuit, a voltage drop estimation circuit, and a compensation circuit. The data conversion circuit converts a plurality of original grayscale data of a target pixel block into current data. The voltage drop estimation circuit converts the current data into transmission line voltage drop information of the target pixel block. The compensation circuit converts the transmission line voltage drop information into at least one pixel compensation value of the target pixel block, and uses the at least one pixel compensation value to compensate the original grayscale data of the target pixel block, so as to generate a plurality of compensated grayscale data of the target pixel block.

27 Claims, 7 Drawing Sheets

(56) References Cited

U.S. PATENT DOCUMENTS

| | | | | |
|---|---|---|---|---|
| 2020/0051508 | A1* | 2/2020 | Tan | G09G 3/3291 |
| 2022/0013068 | A1* | 1/2022 | Lin | G09G 3/3233 |
| 2023/0005409 | A1 | 1/2023 | Lee et al. | |
| 2023/0089942 | A1 | 3/2023 | Shi et al. | |

FOREIGN PATENT DOCUMENTS

| | | |
|---|---|---|
| CN | 111028784 | 4/2020 |
| CN | 111754942 | 10/2020 |
| CN | 113628589 | 11/2021 |

OTHER PUBLICATIONS

"Office Action of Taiwan Counterpart Application", issued on Apr. 10, 2024, p. 1-p. 7.

"Office Action of Taiwan Related Application, Application No. 112144771", issued on Aug. 21, 2024, p. 1-p. 5.

* cited by examiner

DISPLAY DEVICE AND GRAYSCALE COMPENSATION METHOD THEREOF

BACKGROUND

Technical Field

The disclosure relates to an electronic device. Particularly, the disclosure relates to a display device and a grayscale compensation method thereof.

Description of Related Art

A source driver may drive a plurality of data lines of a display panel. Because of the impedance of the data line, there may be different voltage drops (also referred to as IR drops) at different positions of the data line. For example, among a plurality of sub-pixels connected to the same data line, there may be a more serious voltage drop in a sub-pixel farther away from the source driver (the signal source), and there may be a slighter voltage drop in a sub-pixel closer to the source driver.

In addition, a plurality of data lines of a large-sized display panel are typically connected to a plurality of source drivers. A power circuit may supply power to these source drivers through a source driver power line. Therefore, because of the impedance of the source driver power line, there may also be different voltage drops at different positions of the source driver power line. For example, among a plurality of source drivers connected to the same source driver power line, there may be a more serious voltage drop in a source driver farther away from the power circuit (the power source), and there may be a slighter voltage drop in a source driver closer to the power circuit.

SUMMARY

The disclosure provides a display device and a grayscale compensation method thereof to compensate a voltage drop of a transmission line.

In an embodiment of the disclosure, the display device includes a data conversion circuit, a voltage drop estimation circuit, and a compensation circuit. The data conversion circuit is configured to convert a plurality of original grayscale data of a target pixel block into current data. The voltage drop estimation circuit is coupled to the data conversion circuit to receive the current data of the target pixel block. The voltage drop estimation circuit is configured to convert the current data into transmission line voltage drop information of the target pixel block. The compensation circuit is coupled to the voltage drop estimation circuit to receive the transmission line voltage drop information of the target pixel block. The compensation circuit is configured to convert the transmission line voltage drop information into at least one pixel compensation value of the target pixel block, and uses the at least one pixel compensation value to compensate the plurality of original grayscale data of the target pixel block, so as to generate a plurality of compensated grayscale data of the target pixel block.

In an embodiment of the disclosure, the grayscale compensation method includes the following. A plurality of original grayscale data of a target pixel block are converted into current data by a data conversion circuit of the display device. The current data is converted into transmission line voltage drop information of the target pixel block by a voltage drop estimation circuit of the display device. The transmission line voltage drop information is converted into at least one pixel compensation value of the target pixel block by a compensation circuit of the display device. The at least one pixel compensation value is used to compensate the plurality of original grayscale data of the target pixel block by the compensation circuit, so as to generate a plurality of compensated grayscale data of the target pixel block.

Based on the foregoing, the display device in the embodiments of the disclosure may convert the original grayscale data into the current data, and then convert the current data into the transmission line voltage drop information. The display device may convert the transmission line voltage drop information into the pixel compensation value, and use the pixel compensation value to compensate the original grayscale data. Therefore, the display device may compensate the voltage drop of the transmission line.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
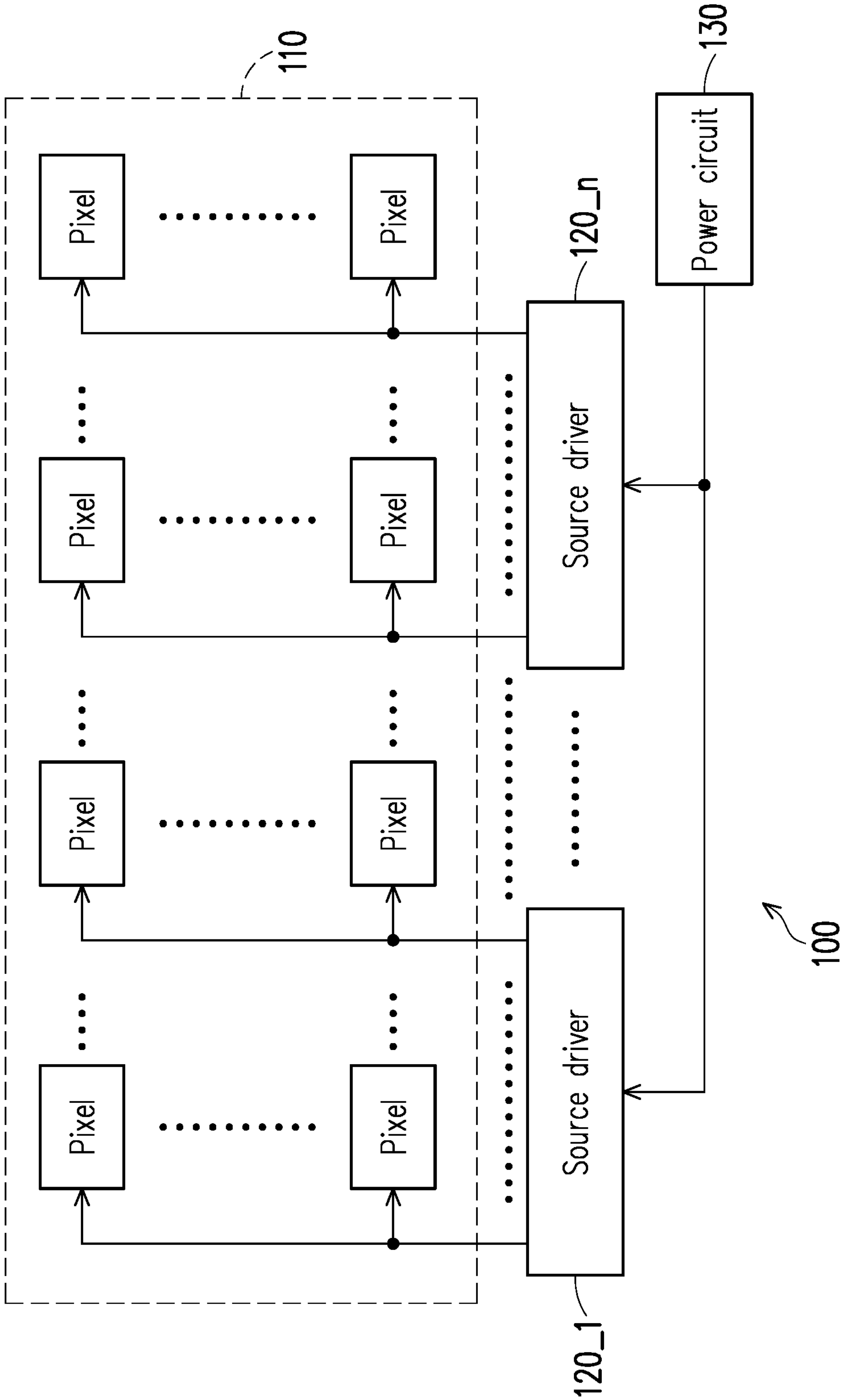
FIG. 1 is a schematic circuit block diagram of a display device according to an embodiment of the disclosure.

The term "coupling (or connection)" used throughout this specification (including the claims) may refer to any direct or indirect means of connection. For example, if it is herein described that a first device is coupled (or connected) to a second device, it should be interpreted that the first device may be directly connected to the second device, or the first device may be indirectly connected to the second device through other devices or some connection means. Terms such as "first" and "second" mentioned throughout this specification (including the claims) are used to name elements, or to distinguish between different embodiments or scopes, and are not used to limit the upper or lower bound of the number of elements, nor used to limit the sequence of elements. In addition, wherever possible, elements/members/steps using the same reference numerals in the drawings and embodiments denote the same or similar parts. Cross-reference may be made to relevant descriptions of elements/members/steps using the same reference numerals or using the same terms in different embodiments.

FIG. 1 is a schematic circuit block diagram of a display device 100 according to an embodiment of the disclosure. The display device 100 shown in FIG. 1 includes a display panel 110, source drivers 120_1 to **120_*n*, and a power circuit 130. All pixels of the display panel 110 may be divided into a plurality of pixel blocks depending on the actual design. Each pixel block includes a plurality of pixels. The source drivers 120_1 to 120_*n* may drive a plurality of data lines (transmission lines) of the display panel 110**. Because of the impedance of the data line, there may be different voltage drops (also referred to as IR drops) at different positions of the data line. For example, among a plurality of pixels connected to the same data line, there may be a more serious voltage drop in a sub-pixel farther away from the source driver (the signal source), and there may be a slighter voltage drop in a sub-pixel closer to the source driver.

Based on the actual applications, the number n of the source drivers 120_1 to **120_*n* may be any integer. The plurality of source drivers 120_1 to 120_*n* may drive the large-sized display panel 110. The power circuit 130 may supply power to the source drivers 120_1 to 120_*n* through a source driver power line (a transmission line). Because of the impedance of the source driver power line, there may also be different voltage drops at different positions of the source driver power line. For example, among the plurality of source drivers 120_1 to 120_*n* connected to the same source driver power line, there may be a more serious voltage drop in a source driver farther away from the power circuit 130 (the power source), and there may be a slighter voltage drop in a source driver closer to the power circuit 130**.

Figure 2:
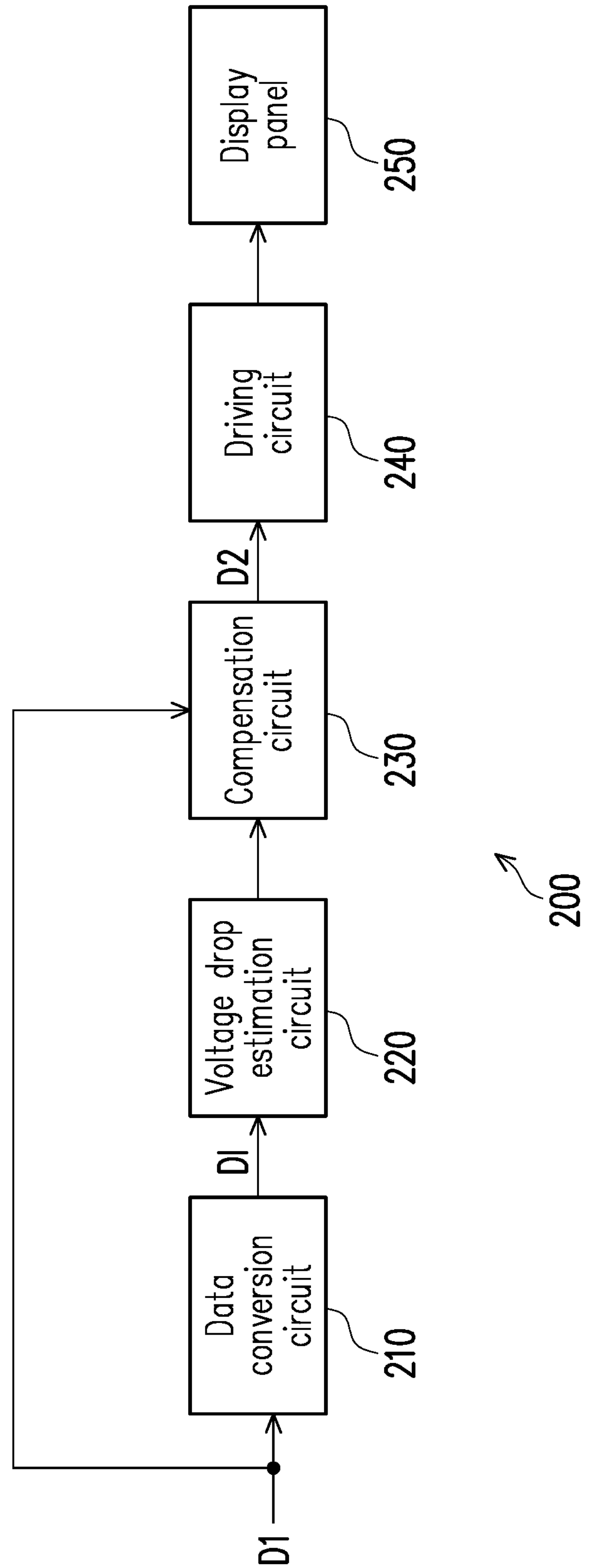
FIG. 2 is a schematic circuit block diagram of a display device according to an embodiment of the disclosure.

FIG. 2 is a schematic circuit block diagram of a display device 200 according to an embodiment of the disclosure. The display device 200 shown in FIG. 2 includes a data conversion circuit 210, a voltage drop estimation circuit 220, a compensation circuit 230, a driving circuit 240, and a display panel 250. The driving circuit 240 may drive a plurality of data lines (not shown in FIG. 2) of the display panel 250. Reference may be made to the relevant description of the display device 100 shown in FIG. 1 for the display device 200 shown in FIG. 2, reference may be made to the relevant description of the source drivers 120_1 to **120_*n* shown in FIG. 1 for the driving circuit 240 shown in FIG. 2, and reference may be made to the relevant description of the display panel 110 shown in FIG. 1 for the display panel 250 shown in FIG. 2**, which will thus not be repeatedly described.

Based on the actual design, in some embodiments, the data conversion circuit 210, the voltage drop estimation circuit 220, the compensation circuit 230, and the drive circuit 240 may be integrated in a source driver integrated circuit. In some other embodiments, the driving circuit 240 may be integrated in a source driver integrated circuit, and the data conversion circuit 210, the voltage drop estimation circuit 220, and the compensation circuit 230 may be realized as another integrated circuit. In some further other embodiments, the data conversion circuit 210, the voltage drop estimation circuit 220, and the compensation circuit 230 may be integrated in a timing controller or other integrated circuits.

According to different designs, in some embodiments, the data conversion circuit 210, the voltage drop estimation circuit 220, and (or) the compensation circuit 230 may be realized as a hardware circuit. In other embodiments, the data conversion circuit 210, the voltage drop estimation circuit 220, and (or) the compensation circuit 230 may be realized as firmware, software (i.e., programs), or a combination thereof. In some embodiments, the data conversion circuit 210, the voltage drop estimation circuit 220, and (or) the compensation circuit 230 may be realized as a combination of multiple ones of hardware, firmware, and software.

In terms of hardware form, the data conversion circuit 210, the voltage drop estimation circuit 220, and (or) the compensation circuit 230 may be realized as a logic circuit on an integrated circuit. For example, the relevant functions of the data conversion circuit 210, the voltage drop estimation circuit 220, and (or) the compensation circuit 230 may be realized as various logic blocks, modules, and circuits in one or more controllers, microcontrollers, microprocessors, application-specific integrated circuits (ASICs), digital signal processors (DSPs), field programmable gate arrays (FPGAs), central processing units (CPUs), and/or other processing units. The relevant functions of the data conversion circuit 210, the voltage drop estimation circuit 220, and (or) the compensation circuit 230 may be realized as a hardware circuit, such as various logic blocks, modules, and circuits in an integrated circuit, by utilizing hardware description languages (e.g., Verilog HDL or VHDL) or other suitable programming languages.

In terms of software form and/or firmware form, the relevant functions of the data conversion circuit 210, the voltage drop estimation circuit 220, and (or) the compensation circuit 230 may be realized as programming codes. For example, the data conversion circuit 210, the voltage drop estimation circuit 220, and (or) the compensation circuit 230 are realized by utilizing general programming languages (e.g., C, C++, or assembly language) or other suitable programming languages. The programming codes may be recorded/stored in a "non-transitory machine-readable storage medium". In some embodiments, the non-transitory machine-readable storage medium includes, for example, a semiconductor memory and/or a storage device. The semiconductor memory includes a memory card, read only memory (ROM), flash memory, a programmable logic circuit, or other semiconductor memory. The storage device includes a tape, a disk, a hard disk drive (HDD), a solid-state drive (SSD), or other storage devices. Electronic equipment (e.g., a computer, CPU, a controller, a microcontroller, or a microprocessor) may read and execute the programming codes from the non-transitory machine-readable storage medium so as to realize the relevant functions of the data conversion circuit 210, the voltage drop estimation circuit 220, and (or) the compensation circuit 230. Alternatively, the programming codes may be provided to the electronic equipment via any transmission medium (e.g., a communication network or a radio wave). The communication network is, for example, the Internet, a wired communication network, a wireless communication network, or other communication media.

Figure 3:
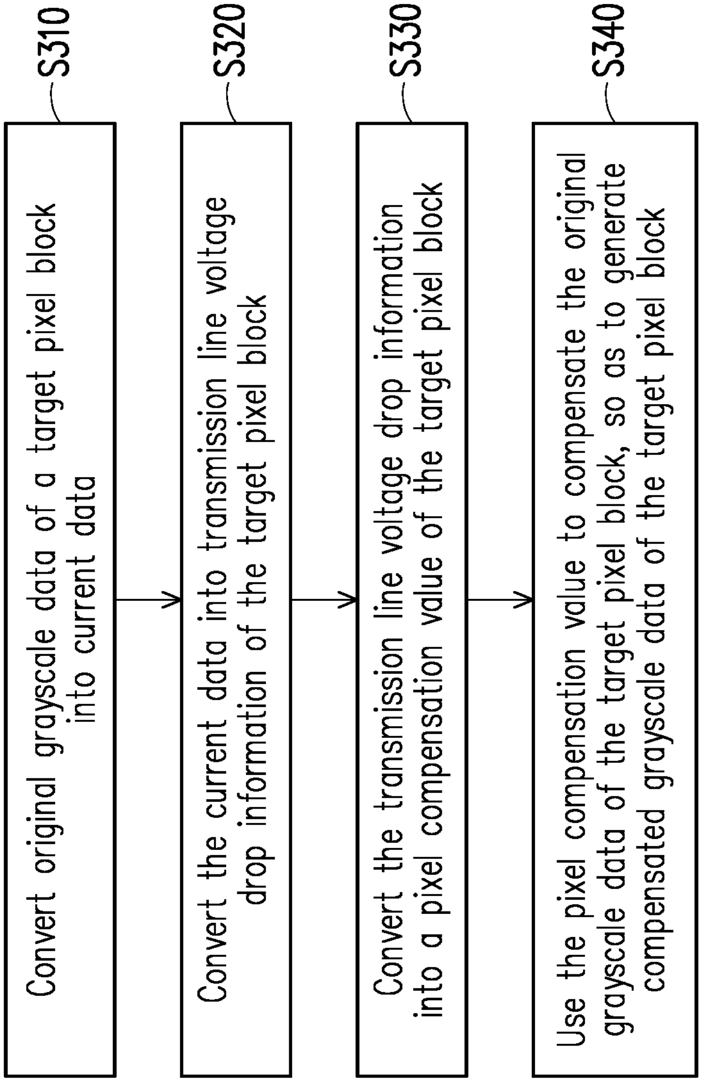
FIG. 3 is a schematic flowchart of a grayscale compensation method of a display device according to an embodiment of the disclosure.

FIG. 3 is a schematic flowchart of a grayscale compensation method of a display device according to an embodiment of the disclosure. With reference to FIG. 2 and FIG. 3, in step S310, the data conversion circuit 210 may convert a plurality of original grayscale data D1 of a target pixel block into current data DI corresponding to the target pixel block. For example, the data conversion circuit 210 may convert the plurality of original grayscale data D1 of the target pixel block into a plurality of sub-pixel current values corresponding to a plurality of sub-pixels of the target pixel block based on one or more grayscale-to-current conversion curves. The grayscale-to-current conversion curve may be set depending on the actual design. For example, in an embodiment, the grayscale-to-current conversion curve may be the well-known Gamma 2.2 curve or other conversion curves.

Figure 4:
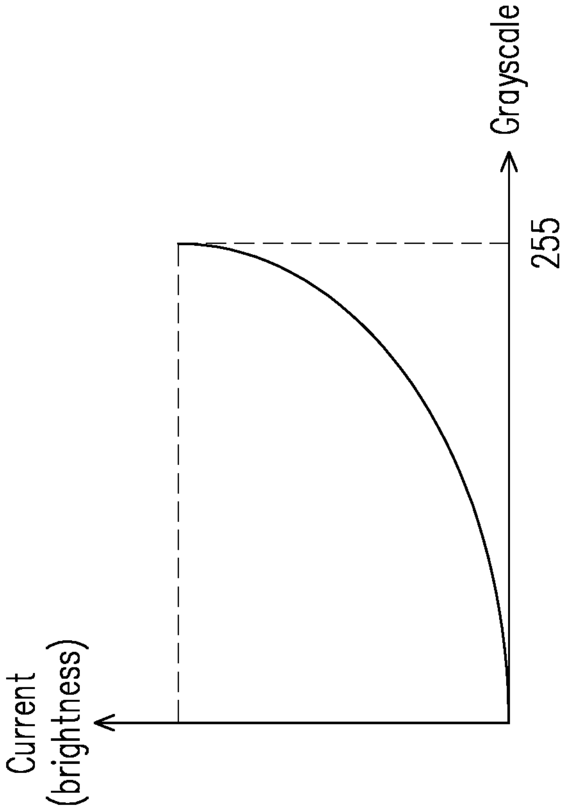
FIG. 4 is a schematic diagram of a grayscale-to-current conversion curve according to another embodiment of the disclosure.

FIG. 4 is a schematic diagram of a grayscale-to-current conversion curve according to another embodiment of the disclosure. The horizontal axis shown in FIG. 4 represents the grayscale, and the vertical axis shown in FIG. 4 represents the current (brightness). In the embodiment shown in FIG. 4, although it is assumed that the maximum grayscale is 255, the actual maximum grayscale may be set to other grayscale values depending on the actual design. The grayscale-to-current conversion curve shown in FIG. 4 is dependent on the display characteristics of the display panel 250.

Figure 5:
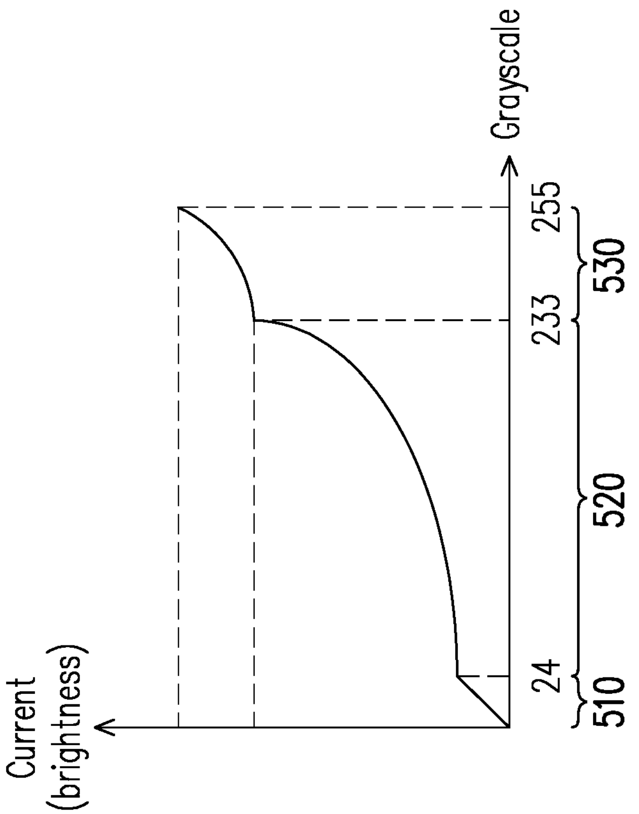
FIG. 5 is a schematic diagram of a grayscale-to-current conversion curve according to yet another embodiment of the disclosure.

FIG. 5 is a schematic diagram of a grayscale-to-current conversion curve according to yet another embodiment of the disclosure. The horizontal axis shown in FIG. 5 represents the grayscale, and the vertical axis shown in FIG. 5 represents the current (brightness). In the embodiment shown in FIG. 5, although it is assumed that the maximum grayscale is 255, the actual maximum grayscale may be set to other grayscale values depending on the actual design. In the embodiment shown in FIG. 5, the range of the grayscale data may be divided into a plurality of intervals (e.g., intervals 510, 520, and 530 shown in FIG. 5). In the embodiment shown in FIG. 5, although it is assumed that the dividing points of the intervals are 24 and 233, the actual dividing points and the number of intervals may be set depending on the actual design.

In the embodiment shown in FIG. 5, there are different grayscale-to-current conversion curves in different intervals. For example (but not limited thereto), the grayscale-to-current conversion curve in the interval 510 is a linear curve, the grayscale-to-current conversion curve in the interval 530 is the Gamma 2.2 curve, and the grayscale-to-current conversion curve in the interval 520 is a conversion curve other than the Gamma 2.2 curve. For example (but not limited thereto), the grayscale-to-current conversion curve in the interval 520 may be Formula (1) below. In Formula (1), I represents the sub-pixel current value corresponding to the sub-pixel, U represents the upper boundary grayscale value (e.g., 233 or other real numbers) of the interval 520, L represents the lower boundary grayscale value (e.g., 24 or other real numbers) of the interval 520, M represents the maximum grayscale value (e.g., 255 or other real numbers) of the range of the original grayscale data D1, and D1 represents the original grayscale data of the sub-pixel. The data conversion circuit 210 may convert the plurality of original grayscale data of the target pixel block into a plurality of sub-pixel current values corresponding to a plurality of sub-pixels of the target pixel block based on the plurality of grayscale-to-current conversion curves shown in FIG. 5.

$$I = \left[(U - L)/M\right] * D1 + L \qquad \text{Formula (1)}$$

With reference to FIG. 2 and FIG. 3, the data conversion circuit 210 may use the plurality of sub-pixel current values of the target pixel block to calculate the current data DI corresponding to the target pixel block in step S310. For example, the data conversion circuit 210 may perform average calculation on the plurality of sub-pixel current values of the target pixel block according to colors to generate a plurality of color current average values of the target pixel block. The data conversion circuit 210 may perform weighting calculation on the plurality of color current average values of the target pixel block to generate the current data DI of the target pixel block.

It is assumed that the target pixel block includes a plurality of red sub-pixels, a plurality of green sub-pixels, and a plurality of blue sub-pixels. The data conversion circuit 210 may average red sub-pixel current values to generate a red current average value. The data conversion circuit 210 may average green sub-pixel current values to generate a green current average value. The data conversion circuit 210 may average blue sub-pixel current values to generate a blue current average value. The data conversion circuit 210 may perform weighting calculation on the red current average value, the green current average value, and the blue current average value of the target pixel block to generate the current data DI corresponding to the target pixel block. For example (but not limited thereto), the data conversion circuit 210 may calculate Formula (2) below. In Formula (2), DI represents the current data corresponding to the target pixel block, Wr represents the red weight, R represents the red current average value, Wg represents the green weight, G represents the green current average value, Wb represents the blue weight, B represents the blue current average value, and M represents the maximum grayscale value (e.g., 255 or other real numbers). The values of the red weight Wr, the green weight Wg, and the blue weight Wb may be set depending on the actual design.

$$DI = (Wr * R + Wg * G + Wb * B)/M \qquad \text{Formula (2)}$$

With reference to FIG. 2 and FIG. 3, the voltage drop estimation circuit 220 is coupled to the data conversion circuit 210 to receive the current data DI of the target pixel block. In step S320, the voltage drop estimation circuit 220 may convert the current data DI into transmission line voltage drop information of the target pixel block. Assuming that a transmission line of the display panel 250 corresponds to a plurality of pixel groups (e.g., all pixel blocks in one pixel block column) of the display panel 250, the data conversion circuit 210 may provide the current data DI of all pixel blocks of one pixel block column to the voltage drop estimation circuit 220. The voltage drop estimation circuit 220 may accumulate the current data DI of the pixel blocks of the same pixel block column along an inverse transmission direction of the transmission line to know a current accumulation value corresponding to each pixel block. The voltage drop estimation circuit 220 may count the current accumulation values of the pixel blocks of the same pixel block column along a transmission direction of the transmission line to get a voltage drop characteristic value (an IR drop characteristic value) corresponding to each pixel block. The voltage drop estimation circuit 220 may use the voltage drop characteristic value of the target pixel block and a reference voltage drop characteristic value of the target pixel block to calculate a voltage drop ratio (the transmission line voltage drop information).

Figure 6:
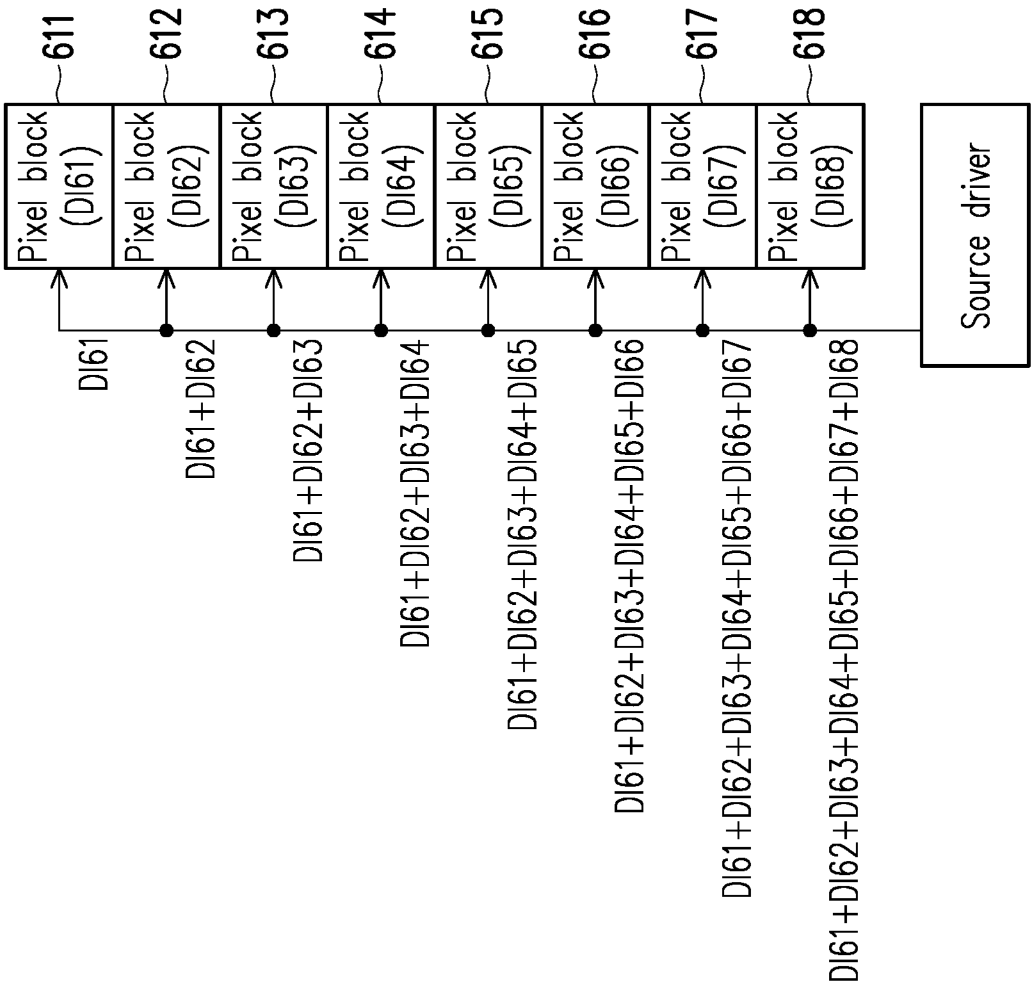
FIG. 6 is a schematic diagram of one pixel block column according to an embodiment of the disclosure.

FIG. 6 is a schematic diagram of one pixel block column according to an embodiment of the disclosure. The number of pixel blocks of one pixel block column may be determined depending on the actual design. For example, the pixel block column shown in FIG. 6 includes pixel blocks 611, 612, 613, 614, 615, 616, 617, and 618. In a case where the transmission line is a data line, a plurality of pixel groups corresponding to the transmission line are different pixel blocks in a same column (e.g., the pixel blocks 611 to 618 shown in FIG. 6) of the display panel, and the voltage drop ratio may include a 1-D (one-dimensional) voltage drop ratio. It is assumed that the current data DI of the pixel blocks 611 to 618 are respectively DI61, DI62, DI63, DI64, DI65, DI66, DI67, and DI68. The voltage drop estimation circuit 220 may accumulate current data DI61 to DI68 of the pixel blocks 611 to 618 of the same pixel block column along the inverse transmission direction of the transmission line (the data line) to know the current accumulation value corresponding to each pixel block. The current accumulation value of the pixel block 611 shown in FIG. 6 is CA61=DI61. The current accumulation value of the pixel block 612 shown in FIG. 6 is CA62=CA61+DI62. The current accumulation value of the pixel block 613 shown in FIG. 6 is CA63=CA62+DI63. The current accumulation value of the pixel block 614 shown in FIG. 6 is CA64=CA63+DI64. The current accumulation value of the pixel block 615 shown in FIG. 6 is CA65=CA64+DI65. The current accumulation value of the pixel block 616 shown in FIG. 6 is CA66=CA65+DI66. The current accumulation value of the pixel block 617 shown in FIG. 6 is CA67=CA66+DI67. The current accumulation value of the pixel block 618 shown in FIG. 6 is CA68=CA67+DI68.

The voltage drop estimation circuit 220 may count the current accumulation values of the pixel blocks 611 to 618 of the same pixel block column along the transmission direction of the transmission line to know the voltage drop characteristic value corresponding to each pixel block. The voltage drop characteristic value of the pixel block 618 is IRD68=CA68. The voltage drop characteristic value of the pixel block 617 is IRD67=IRD68+CA67. The voltage drop characteristic value of the pixel block 616 is IRD66=IRD67+CA66. The voltage drop characteristic value of the pixel block 615 is IRD65=IRD66+CA65. The voltage drop characteristic value of the pixel block 614 is IRD64=IRD65+CA64. The voltage drop characteristic value of the pixel block 613 is IRD63=IRD64+CA63. The voltage drop characteristic value of the pixel block 612 is IRD62=IRD63+CA62. The voltage drop characteristic value of the pixel block 611 is IRD61=IRD62+CA61.

The voltage drop estimation circuit 220 may use the voltage drop characteristic value of the target pixel block and the reference voltage drop characteristic value of the target pixel block to calculate the 1-D voltage drop ratio (the transmission line voltage drop information). The reference voltage drop characteristic value may be set depending on the actual design. For example, the reference voltage drop characteristic value includes a maximum voltage drop characteristic value of the target pixel block in a case where each sub-pixel of all pixel blocks corresponding to the transmission line (the data line) is a maximum grayscale. It is assumed that the maximum voltage drop characteristic values of the pixel blocks 611 to 618 shown in FIG. 6 are respectively IRDM61, IRDM62, IRDM63, IRDM64, IRDM65, IRDM66, IRDM67, and IRDM68. The 1-D voltage drop ratio (the transmission line voltage drop information) of the pixel block 611 is R1D61=IRD61/IRDM61. By analogy, the 1-D voltage drop ratio (the transmission line voltage drop information) of the pixel block 618 is R1D68=IRD68/IRDM68.

In the scenario shown in FIG. 6, the transmission line voltage drop information of different pixel blocks in the same pixel block column has been taken into consideration, that is, the transmission line voltage drop in the vertical direction of the display panel has been taken into consideration. Analogy of the same concept may be made to the transmission line voltage drop in the horizontal direction of the display panel. In a case where the transmission line is a source driver power line, "pixel groups corresponding to the transmission line" may be a plurality of pixel block columns of the display panel, and the voltage drop ratio may include a 2-D (two-dimensional) voltage drop ratio.

Figure 7:
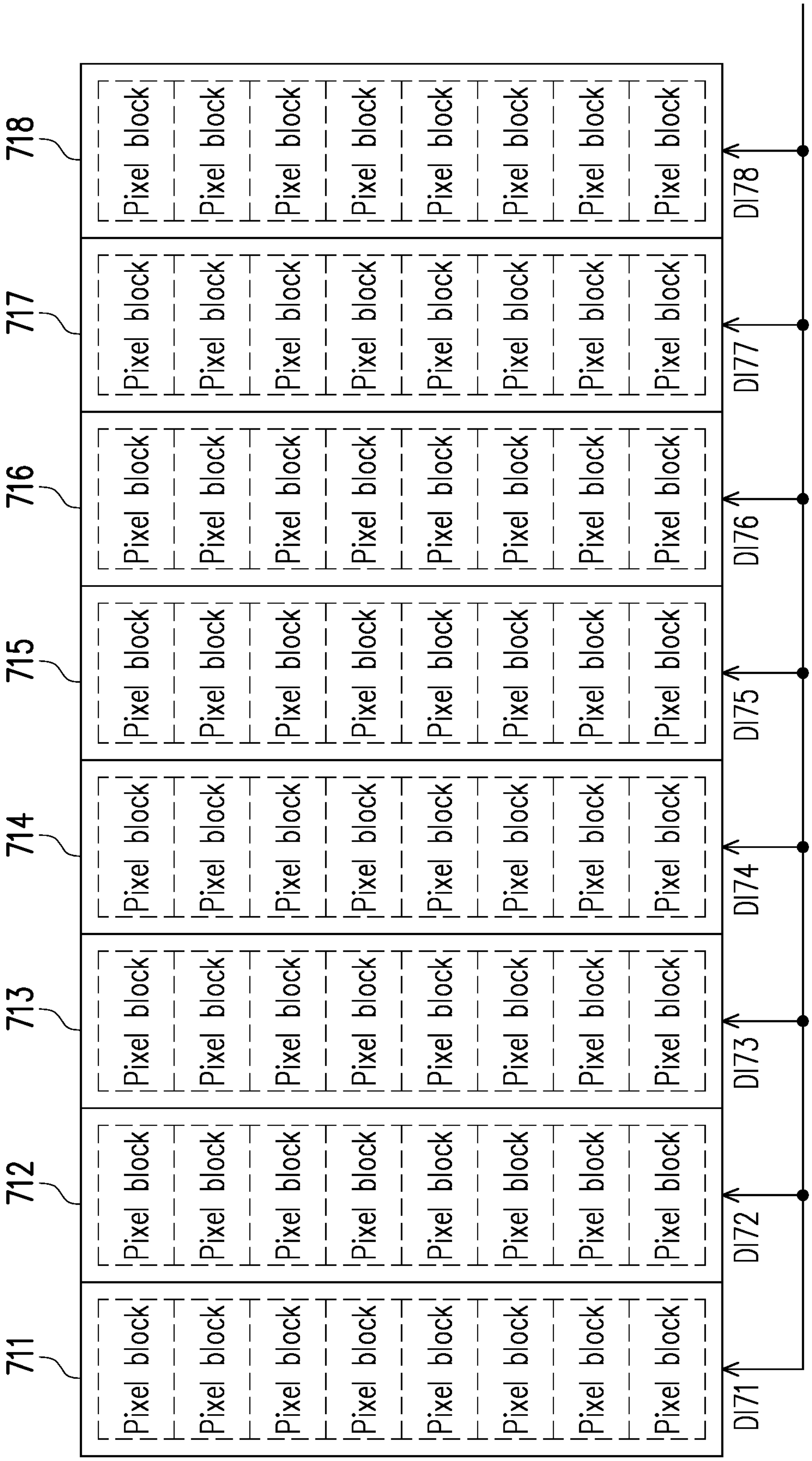
FIG. 7 is a schematic diagram of a plurality of pixel block columns according to an embodiment of the disclosure.

FIG. 7 is a schematic diagram of a plurality of pixel block columns according to an embodiment of the disclosure. The number of pixel block columns of one display panel may be determined depending on the actual design. For example, the display panel shown in FIG. 7 includes pixel block columns 711, 712, 713, 714, 715, 716, 717, and 718. Analogy may be made with reference to the relevant description of the pixel block column shown in FIG. 6 for any one of the pixel block columns 711 to 718 shown in FIG. 7, which are thus not repeatedly described. The voltage drop estimation circuit 220 may accumulate the current data DI of all pixel blocks of the same pixel block column (see the description of the embodiment shown in FIG. 6 for details) to know the current data of the pixel block column. It is assumed that current data of the pixel block columns 711 to 718 are respectively DI71, DI72, DI73, DI74, DI75, DI76, DI77, and DI78. The voltage drop estimation circuit 220 may accumulate the current data DI71 to DI78 of the pixel block columns 711 to 718 along an inverse transmission direction of the transmission line (the source driver power line) to know the current accumulation value corresponding to each pixel block column. The current accumulation value of the pixel block column 711 shown in FIG. 7 is CA71=DI71. The current accumulation value of the pixel block column 712 shown in FIG. 7 is CA72=CA71+DI72. The current accumulation value of the pixel block column 713 shown in FIG. 7 is CA73=CA72+DI73. The current accumulation value of the pixel block column 714 shown in FIG. 7 is CA74=CA73+DI74. The current accumulation value of the pixel block column 715 shown in FIG. 7 is CA75=CA74+DI75. The current accumulation value of the pixel block column 716 shown in FIG. 7 is CA76=CA75+DI76. The current accumulation value of the pixel block column 717 shown in FIG. 7 is CA77=CA76+DI77. The current accumulation value of the pixel block column 718 shown in FIG. 7 is CA78=CA77+DI78.

The voltage drop estimation circuit 220 may count the current accumulation values of the pixel block columns 711 to 718 along a transmission direction of the transmission line to know the voltage drop characteristic value corresponding to each pixel block column. The voltage drop characteristic value of the pixel block column 718 is IRD78=CA78. The voltage drop characteristic value of the pixel block column 717 is IRD77=IRD78+CA77. The voltage drop characteristic value of the pixel block column 716 is IRD76=IRD77+CA76. The voltage drop characteristic value of the pixel block column 715 is IRD75=IRD76+CA75. The voltage drop characteristic value of the pixel block column 714 is IRD74=IRD75+CA74. The voltage drop characteristic value of the pixel block column 713 is IRD73=IRD74+CA73. The voltage drop characteristic value of the pixel block column 712 is IRD72=IRD73+CA72. The voltage drop characteristic value of the pixel block column 711 is IRD71=IRD72+CA71.

The voltage drop estimation circuit 220 may use the voltage drop characteristic value of a target pixel block column and a reference voltage drop characteristic value of the target pixel block column to calculate the 2-D voltage drop ratio (the transmission line voltage drop information). The reference voltage drop characteristic value of the target pixel block column may be set depending on the actual design. For example, the reference voltage drop characteristic value of the target pixel block column includes a maximum voltage drop characteristic value of the target pixel block column in a case where each sub-pixel of the target pixel block column is a maximum grayscale. It is assumed that the maximum voltage drop characteristic values of the pixel block columns 711 to 718 shown in FIG. 7 are respectively IRDM71, IRDM72, IRDM73, IRDM74, IRDM75, IRDM76, IRDM77, and IRDM78. The 2-D voltage drop ratio (the transmission line voltage drop information) of the pixel block column 711 is R2D71=IRD71/IRDM71. By analogy, the 2-D voltage drop ratio (the transmission line voltage drop information) of the pixel block column 718 is R2D78=IRD78/IRDM78.

With reference to FIG. 2 and FIG. 3, the compensation circuit 230 is coupled to the voltage drop estimation circuit 220 to receive the transmission line voltage drop information of the target pixel block (and/or the transmission line voltage drop information of the target pixel block column). In step S330, the compensation circuit 230 may convert the transmission line voltage drop information into at least one pixel compensation value of the target pixel block (and/or at least one pixel compensation value of the target pixel block column). For example (but not limited thereto), the compensation circuit 230 may obtain at least one first compensation value corresponding to the target pixel block from at least one lookup table based on a position of the target pixel block. The compensation circuit 230 may use the first compensation value and the transmission line voltage drop information of the target pixel block to calculate a second compensation value of the target pixel block. The compensation circuit 230 may convert the second compensation value into the pixel compensation value of the target pixel block. The compensation circuit 230 may use the pixel compensation value to compensate the original grayscale data of the target pixel block, so as to generate compensated grayscale data D2 of the target pixel block.

As an example, the at least one lookup table may include a maximum (Max) loading condition lookup table and a minimum (Min) loading condition lookup table, the first compensation value corresponding to the target pixel block includes a maximum loading condition compensation value and a minimum loading condition compensation value, and the transmission line voltage drop information of the target pixel block includes the 1-D voltage drop ratio and the 2-D voltage drop ratio corresponding to the target pixel block. The content of the maximum loading condition lookup table may be ideal compensation values (the maximum loading condition compensation values) corresponding to pixel blocks at different positions in a case where all pixels of the display panel emit light at the maximum grayscale. The content of the minimum loading condition lookup table may be ideal compensation values (the minimum loading condition compensation values) corresponding to pixel blocks at different positions in a case where all pixels of the display panel emit light at the minimum grayscale. The compensation circuit 230 may obtain the maximum loading condition compensation value corresponding to the target pixel block from the maximum loading condition lookup table based on the position of the target pixel block in the display panel. In addition, the compensation circuit 230 may obtain the minimum loading condition compensation value corresponding to the target pixel block from the minimum loading condition lookup table based on the position of the target pixel block.

The compensation circuit 230 may use the maximum loading condition compensation value, the minimum loading condition compensation value, the 1-D voltage drop ratio, and the 2-D voltage drop ratio to calculate the second compensation value of the target pixel block. For example (but not limited thereto), the compensation circuit 230 may calculate Formula (3) below. In Formula (3), Comp represents the second compensation value, Cmin represents the minimum loading condition compensation value, Cmax represents the maximum loading condition compensation value, R1D represents the 1-D voltage drop ratio, and R2D represents the 2-D voltage drop ratio.

$$Comp = C\min + (C\min - C\max) * R1D * R2D \qquad \text{Formula (3)}$$

In some embodiments, the compensation circuit 230 may use the second compensation value as the at least one pixel compensation value. In some other embodiments, the compensation circuit 230 may convert the second compensation value of the target pixel block into the at least one pixel compensation value of the target pixel block. With reference to FIG. 2 and FIG. 3, in step S340, the compensation circuit 230 may use the at least one pixel compensation value to compensate the original grayscale data of the target pixel block, so as to generate the compensated grayscale data D2 of the target pixel block. The compensation circuit 230 may provide the compensated grayscale data D2 to the driving circuit 240 so as to drive the display panel 250 to display images.

As an example, in some embodiments, the at least one pixel compensation value includes a plurality of sub-pixel compensation values corresponding to different sub-pixels in the target pixel block. The compensation circuit 230 may convert the second compensation value of the target pixel block into the sub-pixel compensation value corresponding to each of a plurality of edge sub-pixels of the target pixel block. For example (but not limited thereto), the compensation circuit 230 may use the second compensation value of the target pixel block and the second compensation value of an adjacent pixel block adjacent to the target pixel block to perform interpolation/extrapolation to calculate the second compensation values of the plurality of edge sub-pixels (e.g., sub-pixels at four corners) of the target pixel block. The compensation circuit 230 may use the sub-pixel compensation values of these edge sub-pixels to perform interpolation/extrapolation to calculate the sub-pixel compensation value corresponding to each of the other sub-pixels in the target pixel block. Therefore, the compensation circuit 230 may use the pixel compensation values corresponding to different sub-pixels to compensate the original grayscale data of different sub-pixels, so as to generate the compensated grayscale data D2 of these sub-pixels.

Figure 8:
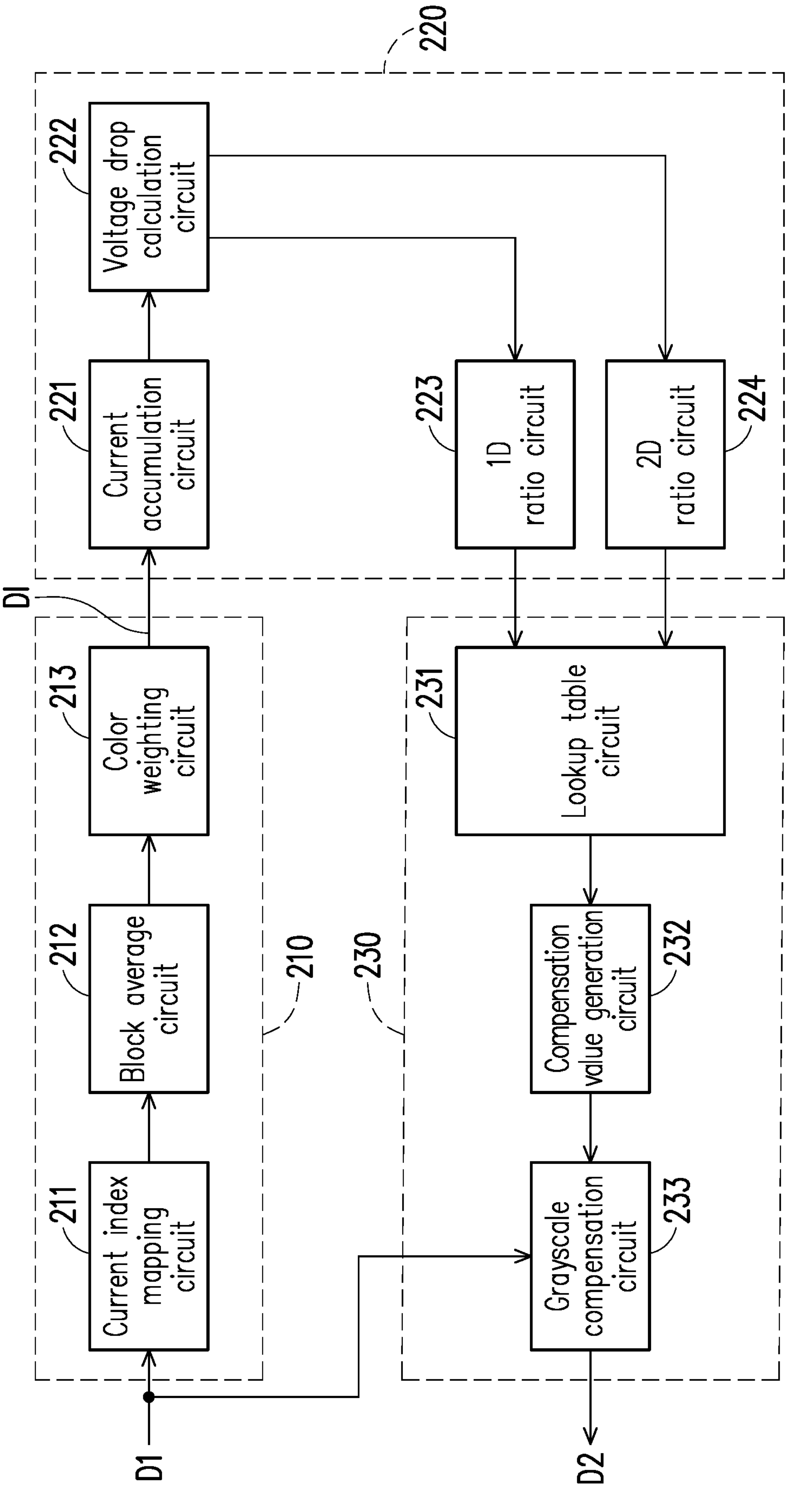
FIG. 8 is a schematic circuit block diagram of a data conversion circuit, a voltage drop estimation circuit, and a compensation circuit according to an embodiment of the disclosure.

FIG. 8 is a schematic circuit block diagram of a data conversion circuit 210, a voltage drop estimation circuit 220, and a compensation circuit 230 according to an embodiment of the disclosure. The data conversion circuit 210, the voltage drop estimation circuit 220, and the compensation circuit 230 shown in FIG. 8 may be taken as one of many implementation examples of the data conversion circuit 210, the voltage drop estimation circuit 220, and the compensation circuit 230 shown in FIG. 2. Reference may be made to the relevant descriptions of the data conversion circuit 210, the voltage drop estimation circuit 220, and the compensation circuit 230 shown in FIG. 2 for the data conversion circuit 210, the voltage drop estimation circuit 220, and the compensation circuit 230 shown in FIG. 8, which will thus not be repeatedly described.

In the embodiment shown in FIG. 8, the data conversion circuit 210 includes a current index mapping circuit 211, a block average circuit 212, and a color weighting circuit 213. The current index mapping circuit 211 may convert the original grayscale data D1 of the target pixel block into a plurality of sub-pixel current values corresponding to a plurality of sub-pixels of the target pixel block based on a grayscale-to-current conversion curve. For example (but not limited thereto), the current index mapping circuit 211 may convert the original grayscale data D1 of the target pixel block into a plurality of sub-pixel current values corresponding to a plurality of sub-pixels of the target pixel block based on the grayscale-to-current conversion curve shown in FIG. 4, the grayscale-to-current conversion curve shown in FIG. 5, or other conversion curves.

The block average circuit 212 is coupled to the current index mapping circuit 211 to receive the sub-pixel current values. The block average circuit 212 may perform average calculation on the sub-pixel current values of the target pixel block according to colors to generate a plurality of color current average values of the target pixel block. It is assumed that the target pixel block includes a plurality of red sub-pixels, a plurality of green sub-pixels, and a plurality of blue sub-pixels. The block average circuit 212 may average red sub-pixel current values to generate a red current average value R. The block average circuit 212 may average green sub-pixel current values to generate a green current average value G. The block average circuit 212 may average blue sub-pixel current values to generate a blue current average value B.

The color weighting circuit 213 is coupled to the block average circuit 212 to receive the color current average values. The color weighting circuit 213 may perform weighting calculation on the color current average values of the target pixel block to generate the current data DI of the target pixel block. For example (but not limited thereto), the data conversion circuit 210 may calculate Formula (2) above to generate the current data DI of the target pixel block.

In the embodiment shown in FIG. 8, the voltage drop estimation circuit 220 includes a current accumulation circuit 221, a voltage drop calculation (IR drop calculation) circuit 222, a one-dimensional (1-D) ratio circuit 223, and a two-dimensional (2-D) ratio circuit 224. The current accumulation circuit 221 is coupled to the data conversion circuit 210 to receive the current data DI of each pixel block of the display panel. The current accumulation circuit 221 may accumulate the current data of different pixel blocks in the same pixel block column along an inverse transmission direction of the data line of the display panel to know the current accumulation value corresponding to each pixel block in the same pixel block column. For example (but not limited thereto), with reference to the relevant description of FIG. 6, the current accumulation circuit 221 may accumulate the current data of different pixel blocks in the same pixel block column to know the current accumulation value corresponding to each pixel block in the same pixel block column.

In addition, the current accumulation circuit 221 may sum up the current data of all pixel blocks in any pixel block column to know column current data of each pixel block column. The current accumulation circuit 221 may accumulate the column current data of different pixel block columns along an inverse transmission direction of the source driver power line to know a column current accumulation value corresponding to each pixel block column. For example (but not limited thereto), with reference to the relevant description of FIG. 7, the current accumulation circuit 221 may accumulate the current data (the column current data) of different pixel block columns to know the current accumulation value (the column current accumulation value) corresponding to each pixel block column.

The voltage drop calculation circuit 222 is coupled to the current accumulation circuit 221 to receive the current accumulation value and the column current accumulation value. The voltage drop calculation circuit 222 may count the current accumulation values of different pixel blocks in the same pixel block column along the transmission direction of the data line to know a column voltage drop characteristic value (a column IR drop characteristic value) corresponding to each pixel block in the same pixel block column. For example (but not limited thereto), with reference to the relevant description of FIG. 6, the voltage drop calculation circuit 222 may count the current accumulation values (the column current accumulation values) of different pixel blocks in the same pixel block column to know the voltage drop characteristic value (the column voltage drop characteristic value) corresponding to each pixel block in the same pixel block column.

In addition, the voltage drop calculation circuit 222 may count the column current accumulation values of different pixel block columns along the transmission direction of the source driver power line to know a row voltage drop characteristic value (a row IR drop characteristic value) corresponding to each pixel block column. For example (but not limited thereto), with reference to the relevant description of FIG. 7, the voltage drop calculation circuit 222 may count the current accumulation values (the column current accumulation values) of different pixel block columns to know the voltage drop characteristic value (the row voltage drop characteristic value) corresponding to each pixel block column.

The 1-D ratio circuit 223 is coupled to the voltage drop calculation circuit 222 to receive the column voltage drop characteristic value. The 1-D ratio circuit 223 may use the column voltage drop characteristic value of the target pixel block and a reference column voltage drop characteristic value of the target pixel block to calculate a 1-D voltage drop ratio corresponding to the target pixel block. For example, assuming that the column voltage drop characteristic value of the target pixel block is IRD68 and the reference column voltage drop characteristic value of the target pixel block is IRDM68, then the 1-D voltage drop ratio (the transmission line voltage drop information) of the target pixel block is R1D68=IRD68/IRDM68.

The 2-D ratio circuit 224 is coupled to the voltage drop calculation circuit 222 to receive the row voltage drop characteristic value. The 2-D ratio circuit 224 may use the row voltage drop characteristic value of a target pixel block column corresponding to the target pixel block and a reference row voltage drop characteristic value of the target pixel block column to calculate a 2-D voltage drop ratio corresponding to the target pixel block. For example, assuming that the row voltage drop characteristic value of the target pixel block column corresponding to the target pixel block is IRD78 and the reference row voltage drop characteristic value of the target pixel block column is IRDM78, then the 2-D voltage drop ratio (the transmission line voltage drop information) of the target pixel block is R2D78=IRD78/IRDM78.

In the embodiment shown in FIG. 8, the compensation circuit 230 includes a lookup table circuit 231, a compensation value generation circuit 232, and a grayscale compensation circuit 233. The lookup table circuit 231 is coupled to the voltage drop estimation circuit to receive the transmission line voltage drop information. Here, the transmission line voltage drop information of the target pixel block may include the 1-D voltage drop ratio and the 2-D voltage drop ratio. The lookup table circuit 231 may obtain at least one first compensation value corresponding to the target pixel block from at least one lookup table based on a position of the target pixel block. The lookup table circuit 231 may use the first compensation value and the transmission line voltage drop information of the target pixel block to calculate a second compensation value of the target pixel block.

For example (but not limited thereto), the at least one lookup table may include a maximum loading condition lookup table and a minimum loading condition lookup table. The lookup table circuit 231 may obtain the maximum loading condition compensation value corresponding to the target pixel block from the maximum loading condition lookup table, and obtain the minimum loading condition compensation value corresponding to the target pixel block from the minimum loading condition lookup table based on the position of the target pixel block in the display panel. Using the maximum loading condition compensation value and the minimum loading condition compensation value (the first compensation value), and using the 1-D voltage drop ratio and the 2-D voltage drop ratio (the transmission line voltage drop information) of the target pixel block, the lookup table circuit 231 may calculate the second compensation value of the target pixel block. For example, the lookup table circuit 231 may calculate Formula (3) above to generate the second compensation value of the target pixel block.

The compensation value generation circuit 232 is coupled to the lookup table circuit 231 to receive the second compensation value. The compensation value generation circuit 232 may convert the second compensation value of the target pixel block into at least one pixel compensation value of the target pixel block (e.g., the sub-pixel compensation values corresponding to a plurality of edge sub-pixels of the target pixel block). For example, the compensation value generation circuit 232 may use the second compensation value of the target pixel block and the second compensation value of an adjacent pixel block adjacent to the target pixel block to perform interpolation/extrapolation to calculate the second compensation values of the plurality of edge sub-pixels (e.g., the second compensation values of sub-pixels at four corners) of the target pixel block. Then, the compensation value generation circuit 232 may use the second compensation values (the sub-pixel compensation values) of these edge sub-pixels to perform interpolation/extrapolation to calculate the sub-pixel compensation value corresponding to each of the other sub-pixels in the target pixel block.

The grayscale compensation circuit 233 is coupled to the compensation value generation circuit 232 to receive the pixel compensation value. The grayscale compensation circuit 233 may use the pixel compensation value to compensate the original grayscale data of the target pixel block, so as to generate the compensated grayscale data D2 of the target pixel block.

In summary of the foregoing, the display device according to the embodiments above may convert the original grayscale data D1 into the current data, then convert the current data into the transmission line voltage drop information, further convert the transmission line voltage drop information into the pixel compensation value, and use the pixel compensation value to compensate the original grayscale data D1. Therefore, the display device may compensate the voltage drop of the transmission line.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display device, comprising:

a data conversion circuit, configured to convert a plurality of original grayscale data of a target pixel block into current data;

a voltage drop estimation circuit, coupled to the data conversion circuit to receive the current data of the target pixel block, and configured to convert the current data into transmission line voltage drop information of the target pixel block; and a compensation circuit, coupled to the voltage drop estimation circuit to receive the transmission line voltage drop information of the target pixel block, configured to convert the transmission line voltage drop information into at least one pixel compensation value of the target pixel block, and using the at least one pixel compensation value to compensate the plurality of original grayscale data of the target pixel block, so as to generate a plurality of compensated grayscale data of the target pixel block, wherein the voltage drop estimation circuit accumulates the current data of each of a plurality of pixel groups of the display device corresponding to a transmission line of the display device to know a current accumulation value corresponding to each of the plurality of pixel groups, counts the plurality of current accumulation values of the plurality of pixel groups of the transmission line to know a voltage drop characteristic value corresponding to each of the plurality of pixel groups, and uses the voltage drop characteristic value of the target pixel block and a reference voltage drop characteristic value of the target pixel block to generate the transmission line voltage drop information of the target pixel block.

2. The display device according to claim 1, wherein the data conversion circuit converts the plurality of original grayscale data of the target pixel block into a plurality of sub-pixel current values corresponding to a plurality of sub-pixels of the target pixel block based on a grayscale-to-current conversion curve, the data conversion circuit performs average calculation on the plurality of sub-pixel current values of the target pixel block according to colors to generate a plurality of color current average values of the target pixel block, and the data conversion circuit performs weighting calculation on the plurality of color current average values of the target pixel block to generate the current data of the target pixel block.

3. The display device according to claim 1, wherein the data conversion circuit comprises:

a current index mapping circuit, configured to convert the plurality of original grayscale data of the target pixel block into a plurality of sub-pixel current values corresponding to a plurality of sub-pixels of the target pixel block based on a grayscale-to-current conversion curve;

a block average circuit, coupled to the current index mapping circuit to receive the plurality of sub-pixel current values, wherein the block average circuit is configured to perform average calculation on the plurality of sub-pixel current values of the target pixel block according to colors to generate a plurality of color current average values of the target pixel block; and a color weighting circuit, coupled to the block average circuit to receive the plurality of color current average values, wherein the color weighting circuit performs weighting calculation on the plurality of color current average values of the target pixel block to generate the current data of the target pixel block.

4. The display device according to claim 1, wherein the transmission line of a display panel of the display device corresponds to the plurality of pixel groups of the display panel, the voltage drop estimation circuit is coupled to the data conversion circuit to receive the current data of each of the plurality of pixel groups of the transmission line, the voltage drop estimation circuit accumulates the plurality of current data of the plurality of pixel groups of the transmission line along an inverse transmission direction of the transmission line to know the current accumulation value corresponding to each of the plurality of pixel groups, the voltage drop estimation circuit counts the plurality of current accumulation values of the plurality of pixel groups of the transmission line along a transmission direction of the transmission line to know the voltage drop characteristic value corresponding to each of the plurality of pixel groups, wherein the transmission line voltage drop information of the target pixel block comprises a voltage drop ratio.

5. The display device according to claim 4, wherein the plurality of pixel groups of the transmission line are different pixel blocks in a same column of the display panel, and the reference voltage drop characteristic value comprises a maximum voltage drop characteristic value of the target pixel block in a case where each sub-pixel of all pixel blocks corresponding to the transmission line is a maximum grayscale.

6. The display device according to claim 4, wherein, the plurality of pixel groups of the transmission line are different pixel blocks in a same column of the display panel and the voltage drop ratio is a one-dimensional voltage drop ratio in a case where the transmission line is a data line of the display panel;

the plurality of pixel groups of the transmission line are a plurality of pixel block columns of the display panel and the voltage drop ratio is a two-dimensional voltage drop ratio in a case where the transmission line is a source driver power line; and the transmission line voltage drop information of the target pixel block comprises at least one of the one-dimensional voltage drop ratio and the two-dimensional voltage drop ratio.

7. The display device according to claim 1, wherein the voltage drop estimation circuit comprises:

a current accumulation circuit, coupled to the data conversion circuit to receive the current data of each of a plurality of pixel blocks of a display panel of the display device, wherein the current accumulation circuit accumulates the plurality of current data of the pixel blocks in a same pixel block column along an inverse transmission direction of a data line of the display panel to know a current accumulation value corresponding to each of the pixel blocks in the same pixel block column, the current accumulation circuit sums up the current data of all pixel blocks in any pixel block column to know column current data of each of a plurality of pixel block columns, and the current accumulation circuit accumulates the plurality of column current data of the pixel block columns along an inverse transmission direction of a source driver power line to know a column current accumulation value corresponding to each of the pixel block columns;

a voltage drop calculation circuit coupled to the current accumulation circuit to receive the current accumulation values and the column current accumulation values, wherein the voltage drop calculation circuit counts the current accumulation values of the pixel blocks in the same pixel block column along a transmission direction of the data line to know a column voltage drop characteristic value corresponding to each of the pixel blocks in the same pixel block column, and the voltage drop calculation circuit counts the column current accumulation values of the pixel block columns along a transmission direction of the source driver power line to know a row voltage drop characteristic value corresponding to each of the pixel block columns;

a one-dimensional ratio circuit, coupled to the voltage drop calculation circuit to receive the column voltage drop characteristic values, wherein the one-dimensional ratio circuit uses the column voltage drop characteristic value of the target pixel block and a reference column voltage drop characteristic value of the target pixel block to calculate a one-dimensional voltage drop ratio corresponding to the target pixel block; and a two-dimensional ratio circuit, coupled to the voltage drop calculation circuit to receive the row voltage drop characteristic values, wherein the two-dimensional ratio circuit uses the row voltage drop characteristic value of a target pixel block column corresponding to the target pixel block and a reference row voltage drop characteristic value of the target pixel block column to calculate a two-dimensional voltage drop ratio corresponding to the target pixel block, wherein the transmission line voltage drop information of the target pixel block comprises the one-dimensional voltage drop ratio and the two-dimensional voltage drop ratio.

8. The display device according to claim 1, wherein the compensation circuit obtains at least one first compensation value corresponding to the target pixel block from at least one lookup table based on a position of the target pixel block, the compensation circuit uses the at least one first compensation value and the transmission line voltage drop information of the target pixel block to calculate a second compensation value of the target pixel block, the compensation circuit converts the second compensation value into the at least one pixel compensation value of the target pixel block, and the compensation circuit uses the at least one pixel compensation value to compensate the plurality of original grayscale data of the target pixel block, so as to generate the plurality of compensated grayscale data of the target pixel block.

9. The display device according to claim 8, wherein the at least one lookup table comprises a maximum loading condition lookup table and a minimum loading condition lookup table, the at least one first compensation value corresponding to the target pixel block comprises a maximum loading condition compensation value and a minimum loading condition compensation value, the compensation circuit obtains the maximum loading condition compensation value corresponding to the target pixel block from the maximum loading condition lookup table based on the position of the target pixel block, and the compensation circuit obtains the minimum loading condition compensation value corresponding to the target pixel block from the minimum loading condition lookup table based on the position of the target pixel block.

10. The display device according to claim 9, wherein the transmission line voltage drop information of the target pixel block comprises a one-dimensional voltage drop ratio and a two-dimensional voltage drop ratio corresponding to the target pixel block, and the compensation circuit uses the maximum loading condition compensation value, the minimum loading condition compensation value, the one-dimensional voltage drop ratio, and the two-dimensional voltage drop ratio to calculate the second compensation value of the target pixel block.

11. The display device according to claim 10, wherein the compensation circuit calculates Comp=Cmin+(Cmin−Cmax)*R1D*R2D, where Comp represents the second compensation value, Cmin represents the minimum loading condition compensation value, Cmax represents the maximum loading condition compensation value, R1D represents the one-dimensional voltage drop ratio, and R2D represents the two-dimensional voltage drop ratio.

12. The display device according to claim 8, wherein the at least one pixel compensation value comprises a plurality of sub-pixel compensation values corresponding to different sub-pixels in the target pixel block, the compensation circuit converts the second compensation value of the target pixel block into the sub-pixel compensation value corresponding to each of a plurality of edge sub-pixels of the target pixel block, and the compensation circuit uses the plurality of sub-pixel compensation values of the plurality of edge sub-pixels to perform interpolation to calculate the sub-pixel compensation value corresponding to each of the other sub-pixels of the target pixel block.

13. The display device according to claim 1, wherein the compensation circuit comprises:

a lookup table circuit, coupled to the voltage drop estimation circuit to receive the transmission line voltage drop information, wherein the lookup table circuit obtains at least one first compensation value corresponding to the target pixel block from at least one lookup table based on a position of the target pixel block, and the lookup table circuit uses the at least one first compensation value and the transmission line voltage drop information of the target pixel block to calculate a second compensation value of the target pixel block;

a compensation value generation circuit, coupled to the lookup table circuit to receive the second compensation value, wherein the compensation value generation circuit converts the second compensation value into the at least one pixel compensation value of the target pixel block; and a grayscale compensation circuit, coupled to the compensation value generation circuit to receive the at least one pixel compensation value, wherein the grayscale compensation circuit uses the at least one pixel compensation value to compensate the plurality of original grayscale data of the target pixel block, so as to generate the plurality of compensated grayscale data of the target pixel block.

14. The display device according to claim 13, wherein the at least one lookup table comprises a maximum loading condition lookup table and a minimum loading condition lookup table, the at least one first compensation value corresponding to the target pixel block comprises a maximum loading condition compensation value and a minimum loading condition compensation value, the lookup table circuit obtains the maximum loading condition compensation value corresponding to the target pixel block from the maximum loading condition lookup table based on the position of the target pixel block, and the lookup table circuit obtains the minimum loading condition compensation value corresponding to the target pixel block from the minimum loading condition lookup table based on the position of the target pixel block.

15. The display device according to claim 14, wherein the transmission line voltage drop information of the target pixel block comprises a one-dimensional voltage drop ratio and a two-dimensional voltage drop ratio corresponding to the target pixel block, and the lookup table circuit uses the maximum loading condition compensation value, the minimum loading condition compensation value, the one-dimensional voltage drop ratio, and the two-dimensional voltage drop ratio to calculate the second compensation value of the target pixel block.

16. The display device according to claim 15, wherein the lookup table circuit calculates Comp=Cmin+(Cmin−Cmax)*R1D*R2D, where Comp represents the second compensation value, Cmin represents the minimum loading condition compensation value, Cmax represents the maximum loading condition compensation value, R1D represents the one-dimensional voltage drop ratio, and R2D represents the two-dimensional voltage drop ratio.

17. The display device according to claim 13, wherein the at least one pixel compensation value comprises a plurality of sub-pixel compensation values corresponding to different sub-pixels in the target pixel block, the compensation value generation circuit converts the second compensation value of the target pixel block into the sub-pixel compensation value corresponding to each of a plurality of edge sub-pixels of the target pixel block, and the compensation value generation circuit uses the plurality of sub-pixel compensation values of the plurality of edge sub-pixels to perform interpolation to calculate the sub-pixel compensation value corresponding to each of the other sub-pixels of the target pixel block.

18. A grayscale compensation method of a display device, comprising:

converting, by a data conversion circuit of the display device, a plurality of original grayscale data of a target pixel block into current data;

converting, by a voltage drop estimation circuit of the display device, the current data into transmission line voltage drop information of the target pixel block, comprising:

accumulating the current data of each of a plurality of pixel groups of the display device corresponding to a transmission line of the display device to know a current accumulation value corresponding to each of the plurality of pixel groups;

counting the plurality of current accumulation values of the plurality of pixel groups of the transmission line to know a voltage drop characteristic value corresponding to each of the plurality of pixel groups; and using the voltage drop characteristic value of the target pixel block and a reference voltage drop characteristic value of the target pixel block to generate the transmission line voltage drop information of the target pixel block;

converting, by a compensation circuit of the display device, the transmission line voltage drop information into at least one pixel compensation value of the target pixel block; and using, by the compensation circuit, the at least one pixel compensation value to compensate the plurality of original grayscale data of the target pixel block, so as to generate a plurality of compensated grayscale data of the target pixel block.

19. The grayscale compensation method according to claim 18, wherein the operation of converting the plurality of original grayscale data of the target pixel block into the current data comprises:

converting the plurality of original grayscale data of the target pixel block into a plurality of sub-pixel current values corresponding to a plurality of sub-pixels of the target pixel block based on a grayscale-to-current conversion curve;

performing average calculation on the plurality of sub-pixel current values of the target pixel block according to colors to generate a plurality of color current average values of the target pixel block; and performing weighting calculation on the plurality of color current average values of the target pixel block to generate the current data of the target pixel block.

20. The grayscale compensation method according to claim 18, wherein the transmission line of a display panel of the display device corresponds to the plurality of pixel groups of the display panel, and the operation of converting the current data into the transmission line voltage drop information of the target pixel block comprises:

accumulating the plurality of current data of the plurality of pixel groups of the transmission line along an inverse transmission direction of the transmission line to know the current accumulation value corresponding to each of the plurality of pixel groups; and counting the plurality of current accumulation values of the plurality of pixel groups of the transmission line along a transmission direction of the transmission line to know the voltage drop characteristic value corresponding to each of the plurality of pixel groups, wherein the transmission line voltage drop information of the target pixel block comprises a voltage drop ratio.

21. The grayscale compensation method according to claim 20, wherein the plurality of pixel groups of the transmission line are different pixel blocks in a same column of the display panel, and the reference voltage drop characteristic value comprises a maximum voltage drop characteristic value of the target pixel block in a case where each sub-pixel of all pixel blocks corresponding to the transmission line is a maximum grayscale.

22. The grayscale compensation method according to claim 20, wherein the plurality of pixel groups of the transmission line are different pixel blocks in a same column of the display panel and the voltage drop ratio is a one-dimensional voltage drop ratio in a case where the transmission line is a data line of the display panel;

the plurality of pixel groups of the transmission line are a plurality of pixel block columns of the display panel and the voltage drop ratio is a two-dimensional voltage drop ratio in a case where the transmission line is a source driver power line; and the transmission line voltage drop information of the target pixel block comprises at least one of the one-dimensional voltage drop ratio and the two-dimensional voltage drop ratio.

23. The grayscale compensation method according to claim 18, wherein the operation of converting the transmission line voltage drop information into the at least one pixel compensation value of the target pixel block comprises:

obtaining at least one first compensation value corresponding to the target pixel block from at least one lookup table based on a position of the target pixel block;

using the at least one first compensation value and the transmission line voltage drop information of the target pixel block to calculate a second compensation value of the target pixel block; and converting the second compensation value into the at least one pixel compensation value of the target pixel block.

24. The grayscale compensation method according to claim 23, wherein the at least one lookup table comprises a maximum loading condition lookup table and a minimum loading condition lookup table, the at least one first compensation value corresponding to the target pixel block comprises a maximum loading condition compensation value and a minimum loading condition compensation value, and the operation of obtaining the at least one first compensation value corresponding to the target pixel block from the at least one lookup table comprises:

obtaining the maximum loading condition compensation value corresponding to the target pixel block from the maximum loading condition lookup table based on the position of the target pixel block; and obtaining the minimum loading condition compensation value corresponding to the target pixel block from the minimum loading condition lookup table based on the position of the target pixel block.

25. The grayscale compensation method according to claim 24, wherein the transmission line voltage drop information of the target pixel block comprises a one-dimensional voltage drop ratio and a two-dimensional voltage drop ratio corresponding to the target pixel block, and the operation of calculating the second compensation value of the target pixel block comprises:

using the maximum loading condition compensation value, the minimum loading condition compensation value, the one-dimensional voltage drop ratio, and the two-dimensional voltage drop ratio to calculate the second compensation value of the target pixel block.

26. The grayscale compensation method according to claim 25, further comprising:

calculating Comp=Cmin+(Cmin−Cmax)*R1D*R2D, where Comp represents the second compensation value, Cmin represents the minimum loading condition compensation value, Cmax represents the maximum loading condition compensation value, R1D represents the one-dimensional voltage drop ratio, and R2D represents the two-dimensional voltage drop ratio.

27. The grayscale compensation method according to claim 23, wherein the at least one pixel compensation value comprises a plurality of sub-pixel compensation values corresponding to different sub-pixels in the target pixel block, and the operation of converting the second compensation value into the at least one pixel compensation value of the target pixel block comprise:

converting the second compensation value of the target pixel block into the sub-pixel compensation value corresponding to each of a plurality of edge sub-pixels of the target pixel block; and using the plurality of sub-pixel compensation values of the plurality of edge sub-pixels to perform interpolation to calculate the sub-pixel compensation value corresponding to each of the other sub-pixels of the target pixel block.

* * * * *